United States Patent
Nagai et al.

(10) Patent No.: US 12,132,204 B2
(45) Date of Patent: Oct. 29, 2024

(54) COMPOSITION FOR LITHIUM ION SECONDARY BATTERY POSITIVE ELECTRODE, LITHIUM ION SECONDARY BATTERY POSITIVE ELECTRODE, AND LITHIUM ION SECONDARY BATTERY

(71) Applicant: Denka Company Limited, Tokyo (JP)

(72) Inventors: Tatsuya Nagai, Chiba (JP); Shinichiro Osumi, Tokyo (JP); Tetsuya Ito, Chiba (JP)

(73) Assignee: Denka Company Limited, Tokyo (JP)

( * ) Notice: Subject to any disclaimer, the term of this patent is extended or adjusted under 35 U.S.C. 154(b) by 738 days.

(21) Appl. No.: 17/295,235

(22) PCT Filed: Nov. 28, 2019

(86) PCT No.: PCT/JP2019/046659
§ 371 (c)(1),
(2) Date: May 19, 2021

(87) PCT Pub. No.: WO2020/111201
PCT Pub. Date: Jun. 4, 2020

(65) Prior Publication Data
US 2022/0013777 A1    Jan. 13, 2022

(30) Foreign Application Priority Data

Nov. 28, 2018  (JP) ................. 2018-222843

(51) Int. Cl.
*H01M 4/58* (2010.01)
*H01M 4/62* (2006.01)
*H01M 10/0525* (2010.01)
*H01M 4/02* (2006.01)

(52) U.S. Cl.
CPC ............. *H01M 4/58* (2013.01); *H01M 4/625* (2013.01); *H01M 10/0525* (2013.01); *H01M 2004/021* (2013.01); *H01M 2004/028* (2013.01); *H01M 2300/0028* (2013.01)

(58) Field of Classification Search
CPC .... H01M 4/58; H01M 4/625; H01M 10/0525; H01M 10/052; H01M 2004/021; H01M 2004/028; H01M 2300/0028
See application file for complete search history.

(56) References Cited

U.S. PATENT DOCUMENTS

| | | |
|---|---|---|
| 10,153,481 B2 | 12/2018 | Saka et al. |
| 2012/0171566 A1 | 7/2012 | Yoshitake et al. |
| 2015/0171421 A1 | 6/2015 | Akikusa et al. |
| 2017/0288218 A1 | 10/2017 | Horikoshi et al. |
| 2019/0190008 A1 | 6/2019 | Takizawa |
| 2019/0198879 A1 | 6/2019 | Nagai et al. |
| 2019/0248944 A1 | 8/2019 | Nagai et al. |

FOREIGN PATENT DOCUMENTS

| | | | |
|---|---|---|---|
| JP | 11176446 A | 7/1999 | |
| JP | 2001126733 A | 5/2001 | |
| JP | 2007080652 A | 3/2007 | |
| JP | 2010238575 A | 10/2010 | |
| JP | 2014201459 A | 10/2014 | |
| JP | 2015056282 A | 3/2015 | |
| JP | 5991551 B2 | 9/2016 | |
| JP | 2017059297 A | 3/2017 | |
| JP | 2017182989 A | 10/2017 | |
| JP | 6380642 B1 | 8/2018 | |
| WO | 2013179909 A1 | 12/2013 | |
| WO | WO-2014051067 A1 * | 4/2014 | ........ H01M 10/0525 |
| WO | 2016024525 A1 | 2/2016 | |
| WO | 2018021073 A1 | 2/2018 | |
| WO | 2018047454 A1 | 3/2018 | |
| WO | 2018061622 A1 | 4/2018 | |

OTHER PUBLICATIONS

Machine translation of WO 2014/051067, Mesuda et al., "Lithium Ion Secondary Battery", Apr. 2014.*
Transmittal of the Translation of the International Preliminary Report on Patentabiity for PCT/JP2019/046659 dated Jun. 10, 2021, 12 pages.
International Search Report for PCT/JP2019/046659 dated Jan. 21, 2020, 6 pages.
JP Office Action in corresponding JP Application No. 2020-557837, dated Mar. 5, 2024, 6 pages (with translation).

* cited by examiner

*Primary Examiner* — Raymond Alejandro
(74) *Attorney, Agent, or Firm* — Faegre Drinker Biddle & Reath LLP

(57) ABSTRACT

A composition for a positive electrode of a lithium ion secondary battery, the composition comprising:
  an active material capable of storing and extracting lithium ion; and
  an electric conductive material,
  wherein the active material is lithium iron phosphate,
  wherein the conductive material includes carbon black and carbon nanotube,
  wherein the carbon black has an average primary particle diameter of 39 nm or less, and
  wherein the carbon nanotube has an average diameter of 20 nm or less.

9 Claims, 1 Drawing Sheet

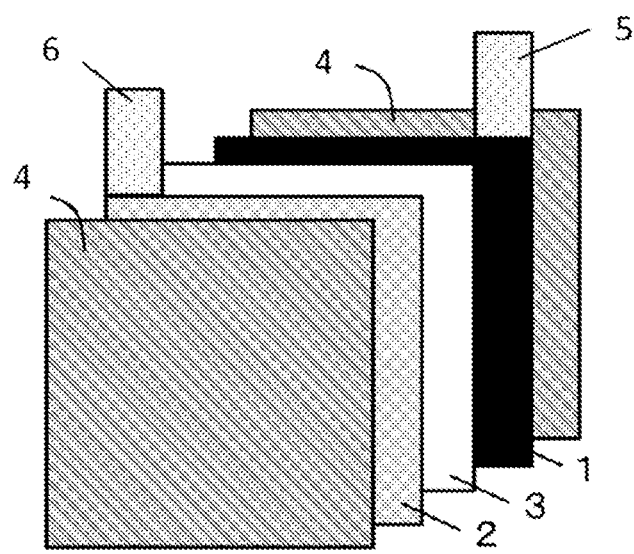

COMPOSITION FOR LITHIUM ION SECONDARY BATTERY POSITIVE ELECTRODE, LITHIUM ION SECONDARY BATTERY POSITIVE ELECTRODE, AND LITHIUM ION SECONDARY BATTERY

TECHNICAL FIELD

The present invention relates to a composition for a lithium ion secondary battery positive electrode. The present invention also relates to a positive electrode for a lithium ion secondary battery, and a lithium ion secondary battery.

BACKGROUNDS

Due to increasing environmental and energy issues, technologies are being actively developed to realize a low-carbon society that reduces dependence on fossil fuels. Various examples of the technologies include the developments of low-emission vehicles such as hybrid electric vehicles and electric vehicles, the development of natural energy power generation/storage systems such as solar power generations and wind power generations, and the development of next-generation power grids to reduce electricity consumption.

Batteries are a key device for those technologies. The batteries have been required to have high energy density for downsizing the system. The batteries have also been requested to have high output characteristics to enable a stable power supply regardless of the ambient temperature. Furthermore, the batteries have been demanded to have good cycle characteristics to enable long-term use. Conventional lead-acid batteries, nickel-cadmium batteries, and nickel-hydrogen batteries have thus been replacing swiftly with lithium ion secondary batteries having higher energy density, output characteristics, and cycle characteristics.

The basic structure of lithium ion secondary batteries includes a positive electrode, a negative electrode, a separator, and an electrolyte. The positive electrode generally has a composition including an active material for the positive electrode (e.g., lithium composite oxide), an electrically conductive material, and a binder; and a metal foil collector such as aluminum. The conductive material is generally a particulate carbon material such as carbon black.

The carbon black has a common 'structure' in which approximately spherical primary particles are connected like a rosary. The length of the structure can be indirectly evaluated by using the DBP absorption amount measured according to the method of JIS K 6217-4:2017. Generally, the larger the DBP absorption amount, the longer the structure. The longer structure exerts good electric conductivity and liquid retention, which is the ability to hold a non-aqueous electrolyte.

In recent years, further improvement in the energy density of the lithium ion secondary battery has been demanded. Therefore, it is required to reduce the content of the conductive material, which does not contribute to the charge/discharge capacity of the electrode, and increase the content of the active material instead. For solving the issue, fibrous carbon material has been used in combination with carbon black. The fibrous carbon material has a higher aspect ratio than particulate carbon materials such as carbon black, and can impart conductivity with a smaller amount compared to the particulate carbon materials.

Patent Document 1 discloses a method for manufacturing a battery having good cycle characteristics, the method comprising crosslinking an active material and carbon black by carbon nanofiber to make a good conductive path. However, the conventional method has a defect if carbon black has a small particle size and a long structure. The formation of the conductive path is insufficient, and it is not possible to increase the amount of the active material.

Patent Document 2 discloses a method for manufacturing a battery having good output characteristics by using the combination of carbon black and carbon nanotubes to prevent a conductive material from distributing unevenly in the electrode. Patent Document 3 discloses a method for manufacturing a battery having good output characteristics by containing 1 to 20% by weight of fibrous carbon material, and 99 to 80% by weight of particulate carbon material, on the basis of 100% by weight of the total conductive materials. However, since the conventional methods need a large amount of a conducting agent, it is impossible to increase the amount of the active material.

Patent Document 4 discloses a method for manufacturing a battery having good output characteristics and cycle characteristics, by using the combination of carbon black and graphitized carbon fiber to stabilize a conductive path in a positive electrode. Patent Document 5 discloses a method for manufacturing a battery having good discharge capacity and cycle characteristics and low resistance, by using the combination of carbon black and fibrous carbon. However, the conventional methods need a thick carbon fiber. The conventional method must use a large amount of the thick carbon fiber to prepare a sufficient conductive path, and the content of the carbon black is so small. The conventional methods are thus not possible to retain a sufficient amount of electrolytic solution around the active material, and the output characteristics are poor under a low-temperature environment.

Meanwhile, lithium iron phosphate having an olivine-type crystal structure has been developed as an active material, because it can store lithium ion therein and extract the lithium ion therefrom. The lithium iron phosphate has a large theoretical capacity (170 mAh/g) and a relatively high electromotive force (around 3.4 to 3.5 Volt vs. Li/Li$^+$ anode). The lithium iron phosphate is thermodynamically stable, and hardly extracts oxygen or generates heat up to about 400 degrees C. Therefore, the lithium iron phosphate is known as a safe material for a positive electrode. The lithium iron phosphate can be prepared inexpensively from iron and phosphorus that are abundant in the world. The lithium iron phosphate is expected to be a powerful positive electrode material. Patent Document 6 discloses a method for producing spherical lithium iron phosphate powder which is inexpensive, has excellent discharge capacity, and is excellent in filling properties in electrodes.

CITATION LIST

Patent Literature

Patent Document 1: International Publication No. 2013/179909
Patent Document 2: Japanese Patent Laid-Open No. 2007-080652
Patent Document 3: Japanese Patent Laid-Open No. 11-176446
Patent Document 4: Japanese Patent Laid-Open No. 2001-126733
Patent Document 5: Japanese Patent Laid-Open No. 2010-238575

Patent Document 6: Japanese Patent Laid-Open No. 2014-201459

SUMMARY OF INVENTION

Technical Problem

However, in the case that lithium iron phosphate is used as an active material, it has not been examined or studied yet whether the combination of carbon black and carbon nanotubes is available, and what formulation is suitable therefore. Additionally, as mentioned above, further improvement is still required if carbon black and carbon nanotubes are used in combination to realize high energy density and good cycle characteristics.

Solution to Problem

In view of the above problems and circumstances, the present invention aims to provide a composition for a positive electrode of a lithium ion secondary battery having a high energy density and excellent cycle characteristics.

As a result of intensive research, the present inventors have found that a specific combination of carbon black and carbon nanotubes works well for lithium iron phosphate as an active material to overcome the above issues. The carbon black has a small particle size and a long structure, and the carbon nanotube has a small fiber diameter and a limited range of the BET specific surface area and the aspect ratio.

Specifically, the present invention can provide a lithium ion secondary battery made from a composition comprising lithium iron phosphate as an active material; carbon black having a small particle diameter as a conductive material; and carbon nanotube having a small fiber diameter as a conductive material. The present lithium ion secondary battery has a high energy density and can exert excellent cycle characteristics. The present invention has been thus completed.

The present invention can provide the following aspects.
(1) A composition for a positive electrode of a lithium ion secondary battery, the composition comprising:
   an active material capable of storing and extracting lithium ion; and
   an electric conductive material,
   wherein the active material is lithium iron phosphate,
   wherein the conductive material includes carbon black and carbon nanotube,
   wherein the carbon black has an average primary particle diameter of 39 nm or less, and
   wherein the carbon nanotube has an average diameter of 20 nm or less.
(2) The composition according to (1), wherein, given that contents of the carbon black and the carbon nanotube in the composition are X and Y (unit: % by mass), respectively, the following conditions A and B are satisfied.

$$1.0 \leq (X+Y) \leq 3.0 \quad \text{A.}$$

$$0.45 \leq \{X/(X+Y)\} \leq 0.55 \quad \text{B.}$$

(3) The composition according to (1) or (2), wherein the carbon black has a DBP absorption amount of 200 to 380 mL/100 g.
(4) The composition according to any one of (1) to (3), wherein the carbon nanotube has a BET specific surface area of 170 m²/g or more and an aspect ratio of 50 or more.
(5) The composition according to any one of (1) to (4), wherein the lithium iron phosphate has an average particle diameter $D_{50}$ of 1 to 4 μm.
(6) The composition according to any one of (1) to (5), wherein the carbon nanotube has an average diameter of 10 nm or less.
(7) The composition according to any one of (1) to (6), wherein the composition includes the lithium iron phosphate in an amount of 95% by mass or more.
(8) A positive electrode for a lithium ion secondary battery, comprising the composition according to any one of (1) to (7).
(9) A lithium ion secondary battery, comprising the positive electrode according to (8).

Advantageous Effects of Invention

According to the present invention, the provided composition enables a lithium ion secondary battery having a high energy density and excellent cycle characteristics.

Further, a preferred embodiment of the present invention can provide a composition to prepare a lithium ion secondary battery having a high energy density, a low internal resistance, and excellent output, cycle, and low-temperature characteristics.

BRIEF DESCRIPTION OF DRAWINGS

FIG. 1 illustrates an example of a basic structure of a lithium ion secondary battery.

DESCRIPTION OF EMBODIMENTS

Hereinafter, the present invention will be described in detail. The present composition for a positive electrode of a lithium ion secondary battery comprises an active material capable of storing and extracting lithium ions, and an electrically conductive material. The active material is lithium iron phosphate. The conductive material includes carbon black and carbon nanotube. The carbon black has an average primary particle diameter of 39 nm or less, and the carbon nanotube has an average diameter of 20 nm or less.

In the present invention, the active material is lithium iron phosphate. The lithium iron phosphate may be prepared by a conventional method such as a solid phase method, a liquid phase method, and a vapor phase method, like other general active materials. Additionally, the lithium iron phosphate may have on the surface a conductive carbon layer prepared by adding a carbon precursor such as coal bitumen (e.g., coal pitch) and saccharide during the sintering process. The lithium iron phosphate having a conductive carbon thereon may exhibit higher charge/discharge characteristics compared to those without deposited carbon layers.

The average particle diameter $D_{50}$ (or median diameter) of the lithium iron phosphate in the present invention may preferably be in the range of 1 μm to 4 μm. If the $D_{50}$ falls within the range, the filling rate of the active material in the obtained positive electrode improves, and the positive electrode is likely to have a higher energy density. Additionally, if the $D_{50}$ falls within the range, the lithium iron phosphate can promote the ability of the conductive material, and the battery can supply a high output even though the amount of the conductive material is so small (the details will be described later). Furthermore, if the $D_{50}$ falls within the range, the lithium iron phosphate can inhibit decomposition of the electrolytic solution for charge/discharge processes, and then the cycle characteristics will improve. Note that, in the present specification, the average particle diameter $D_{50}$ means a value calculated by the steps of: dispersing the active material in ethanol as a dispersion medium; and measuring the diameter of the active material by a laser diffraction/scattering particle size distribution analyzer in accordance with JIS Z 8825:2013. In the present invention, the content of the lithium iron phosphate may preferably be 95% by mass or more based on the total amount of the composition for the positive electrode containing the lithium iron phosphate, the conductive material, and the binder. If the content of the lithium iron phosphate falls within the preferred range, the obtained battery is likely to have sufficiently high energy.

The conductive material for the present invention may be selected from carbon black and carbon nanotubes. The carbon black may be selected from acetylene black, furnace black, channel black and the like that are also used for other general batteries. Among those, acetylene black is preferred since it is excellent in crystallinity and purity.

In the present invention, the carbon black has the average primary particle size of 39 nm or less. Setting the average primary particle diameter to 39 nm or less can increase the number of electrical contacts with the active material and the current collector to improve the conductivity. The lower limit for the average primary particle diameter of carbon black is not particularly limited, but may be 18 nm or more to suppress the interaction between the carbon black particles such that the carbon black particles are uniformly dispersed among the positive electrode active material and a good conductive path is established. From this point of view, the carbon black may preferably have the average primary particle diameter of 20 to 35 nm. In the present specification, the average primary particle diameter is a value obtained by averaging circle-equivalent diameters of particles measured on the basis of photographs taken with a transmission electron microscope or the like.

In the present invention, the carbon black may preferably have the DBP absorption of 200 to 380 mL/100 g. If the DBP absorption amount is 200 mL/100 g or more, the carbon black as a conductive material has a sufficiently long, spread structure to make an excellent conductive path and enable retention of a non-aqueous electrolyte. If the DBP absorption amount is 380 mL/100 g or less, the structures are less likely to entangle each other to suppress the aggregation, and the structures are uniformly dispersed among the positive electrode active material to enable both a formation of an excellent conductive path and sufficient retention of a non-aqueous electrolyte. From this point of view, the carbon black may preferably have the DBP absorption of 220 to 300 mL/100 g. In the present specification, the DBP absorption amount is a value measured according to JIS K 6217-4:2017.

In the present invention, the volume resistivity of carbon black is not particularly limited, but may preferably have a low value from the viewpoint of conductivity. Specifically, the volume resistivity measured under 7.5 MPa compression may preferably be 0.30 Ω·cm or less, more preferably 0.25 Ω·cm or less.

In the present invention, the ash content and water content of carbon black are not particularly limited, but may preferably be a small value for suppressing unfavorable side reactions. Specifically, the ash content may preferably be 0.04% by mass or less, and the water content may preferably be 0.10% by mass or less.

In the present invention, the carbon nanotubes have the average diameter of 20 nm or less. Setting the average diameter of the carbon nanotubes to 20 nm or less increases the number of electrical contacts with the surface of the active material to establish a good conductive path. From this viewpoint, the carbon nanotubes may preferably have the average diameter of 15 nm or less, more preferably 10 nm or less. The carbon nanotubes may preferably have the BET specific surface area of 170 m$^2$/g or more and the aspect ratio of 50 or more to form a conductive path on the surface of the active material efficiently, with few interruptions. From this viewpoint, the carbon nanotubes may preferably have the BET specific surface area of 200 m$^2$/g or more, and the aspect ratio of 100 or more. In the present specification, the average diameter and the aspect ratio are determined from a shape measured by an image analysis method using a transmission electron microscope, a reflection electron microscope, an optical microscope, or the like. The aspect ratio means the ratio of the average length to the average diameter. In the present specification, the BET specific surface area is a value measured by a static capacity method according to JIS Z 8830:2013 using nitrogen as an adsorbate.

In the present invention, the content of the carbon black is represented as "X" in the unit of mass %, and the content of the carbon nanotube is "Y" in the unit of mass %. The parameters may preferably satisfy the relationships of:

$$1.0 \leq (X+Y) \leq 3.0; \text{ and}$$

$$0.45 \leq \{X/(X+Y)\} \leq 0.55.$$

If the parameters meet the former formula, the composition has a reduced amount of the conductive material which does not contribute to the charge/discharge capacity, and a sufficient conductivity can be obtained. If the parameters meet the latter formula, the carbon black can form a conductive path among the active material in the composition, and retain the non-aqueous electrolyte solution in the vicinity of the active material; and the carbon nanotube can form a conductive path on the surface of the active material. The resulted electrode may have both a good conductive path and a good ionic conductivity, and thus the battery may be excellent in battery characteristics.

The present composition may be prepared by any conventionally known methods. For instance, the composition may be prepared and used in the form of solvent dispersion solution of a positive active material, a conductive material, and a binder. The solvent dispersion solution may be prepared by mixing the positive active material, the conductive material, and the binder by a device such as a ball mill, a sand mill, a twin-screw kneader, a rotation-revolution agitator, a planetary mixer, and a dispersion mixer. The positive electrode active material and the conductive material may be those described above. The carbon black and the carbon nanotubes may be separately charged into a mixer, or may be mixed in advance. Examples of the binder may include, for example, polymers such as polyvinylidene fluoride, polytetrafluoroethylene, styrene-butadiene copolymer, polyvinyl alcohol, acrylonitrile-butadiene copolymer, and carboxylic acid-modified (meth)acrylic acid ester copolymer. Among them, polyvinylidene fluoride is preferable from the viewpoint of oxidation resistance. Examples of the dispersion medium may include water, N-methyl-2-pyrrolidone, cyclohexane, methyl ethyl ketone, and methyl isobutyl ketone. If the binder is polyvinylidene fluoride, the dispersion medium may preferably be N-methyl-2-pyrrolidone in terms of solubility.

The present composition may further include additional ingredients other than the positive electrode active material, the conductive material, and the binder unless the additional ingredients impair the effects of the present invention. The additional ingredients may include, for instance, polyvinyl pyrrolidone, polyvinyl imidazole, polyethylene glycol, polyvinyl alcohol, polyvinyl butyral, carboxymethyl cellulose, acetyl cellulose, or a carboxylic acid-modified (meth)acrylic acid ester copolymer to improve dispersibility.

The present positive electrode for a lithium ion secondary battery may be manufactured by any conventionally known methods. The present positive electrode may also be produced by the method comprising steps of: applying the dispersion liquid onto a metal foil current collector such as aluminum; heating the metal foil to remove the dispersion medium from the composition; and forming a film from the composition on the surface of the current collector. And then the current collector and the electrode mixture layer are pressed by a device such as a roll press device to be in close contact with each other to obtain a positive electrode for a lithium ion secondary battery accordingly.

The present lithium ion secondary battery may be manufactured by any conventionally known method. The present lithium ion secondary battery may also be produced by the method comprising the steps of: providing a polyolefin microporous film as an insulating layer between the positive electrode and the negative electrode; and pouring a non-aqueous electrolyte solution into the void between the positive electrode, the negative electrode and the polyolefin microporous film until the void is sufficiently impregnated with the non-aqueous electrolyte solution.

The present lithium ion secondary battery may be used for various purposes. For instance, the present lithium ion secondary battery may be used for portable AV devices such as digital cameras, video cameras, portable audio players, and portable LCD TVs; portable information devices such as laptop computers, smartphones, and mobile PCs; portable game machines; electric tools; electric bicycles; hybrid cars; electric cars; and electric power storage systems.

EXAMPLES

Hereinafter, the present composition will be described in detail with reference to the following examples and comparative examples. The present invention is not limited to the following examples unless it exceeds the gist.

In the following examples and comparative examples, the average primary particle diameter of carbon black was measured by the following method comprising the steps of: taking five pieces of a 100,000-fold image by a transmission electron microscope "JEM-2000FX" manufactured by JEOL Ltd.; extracting from the images 20 or more primary particles randomly; measuring the equivalent circle diameter of the extracted primary particles by an image analysis; and calculating the arithmetic average of the measured values to obtain the average primary particle diameter of carbon black.

The average diameter and the aspect ratio of carbon nanotubes were measured by the following method comprising the steps of: taking ten pieces of a 200,000-fold image by a transmission electron microscope "JEM-2000FX" manufactured by JEOL Ltd.; extracting from the images 20 or more carbon nanotubes randomly; measuring the diameters and the length of the extracted nanotubes by an image analysis; and calculating the averages of the measured values to obtain the average diameter and the aspect ratio of carbon nanotubes.

Example 1

Lithium Ion Secondary Battery Positive Electrode Composition

Used as an active material was lithium iron phosphate having the average particle diameter $D_{50}$ of 4 μm, trade name "M121" manufactured by Aleees. Used as conductive materials were carbon black having the average primary particle diameter of 18 nm and the DBP absorption of 310 mL/100 g, trade name "SAB" manufactured by Denka Co. Ltd., abbreviated as "acetylene black-A" in Table 1; and N-methyl-2-pyrrolidone dispersion of carbon nanotubes having the average diameter of 9 nm and the BET specific surface area of 243 $m^2$/g, trade name "LB107" manufactured by CNano Technology, abbreviated as "CNT-A" in Table 1. 0.45% by mass of the carbon black, 0.55% by mass of the carbon nanotubes (as the dispersed mass), 1.0% by mass of the N-methyl-2-pyrrolidone solution of polyvinylidene fluoride (as the dissolved mass) as the binder, and lithium iron phosphate as the balance (i.e., 98.0 mass % in Example 1) were mixed with N-methyl-2-pyrrolidone as a dispersion medium to obtain a dispersion liquid of a composition for a positive electrode of a lithium ion secondary battery.

Positive Electrode for Lithium Ion Secondary Battery

The dispersion liquid of the composition above was applied onto a 20 μm-thick aluminum foil by using a Baker applicator. Then the foil was dried, pressed, and cut to obtain a positive electrode for a lithium ion secondary battery.

Negative Electrode for Lithium Ion Secondary Battery

A composition for a negative electrode of a lithium ion secondary battery was prepared by mixing 96% by mass of graphite (trade name "AGP-2A" manufactured by Shenzen BTR), 1.0% by mass of carbon black (trade name "Li-400" manufactured by Denka Co. Ltd.), 1.0% by mass of sodium carboxymethylcellulose, and 2.0% by mass of styrene-butadiene copolymer. The negative electrode composition was applied onto a 10 μm-thick copper foil by using a Baker applicator. The foil was then dried, pressed and cut to obtain a negative electrode for a lithium ion secondary battery.

Lithium Ion Secondary Battery

The positive electrode, a separator, and the negative electrode were laminated and packed with an aluminum laminate film. The package was pre-sealed, and then injected with an electrolytic solution. The package was battery-formatted and vacuum-sealed to obtain a laminated-type lithium ion secondary battery.

Internal Resistance

The manufactured lithium ion secondary battery was charged/discharged for 5 cycles in the voltage range of 2.1 to 4.1 Volts, and then subjected to an impedance analysis in the frequency range of 10 MHz to 0.001 Hz, the oscillating voltage of 5 mV. The internal resistance of Example 1 was 25.4 mΩ.

Output Characteristics (Capacity Retention Rate at 5 C-Discharge)

The manufactured lithium ion secondary battery was changed at 25 degrees C. and 4.1 Volts with a constant-current/constant-voltage up to 0.2 C. Then the battery was discharged to 2.1 Volts by a constant-current of 0.2 C. The discharge current was changed to 0.2 C and 5 C, and the discharge capacity for each discharge current was measured. The capacity retention ratio of the 5 C-discharge to the 0.2 C-discharge was calculated. The capacity retention rate at 5 C-discharge in Example 1 was 92.4%.

Cycle Characteristics (Cycle Capacity Retention Rate)

The lithium ion battery was charged to 4.1 Volts at 25 degrees C. with a constant-current/constant-voltage up to 1

C. Then the battery was discharged to 2.1 Volts by a constant-current of 1 C. The cycle of charging and discharging was repeated. The ratio of the discharge capacity at the 500th cycle to the discharge capacity at the 1st cycle was calculated as the cycle capacity retention rate. The cycle capacity retention rate of Example 1 was 90.4%.

Low-Temperature Output Characteristics (Capacity Retention Rate at −20 Degrees C. Discharge)

The lithium ion secondary battery was charged to 4.1 Volts at 25 degrees C. with a constant-current/constant-voltage up to 0.2 C. Then the battery was discharged to 2.1 Volts by a constant-current of 1 C. The battery was further charged to 4.1 Volts with a constant-current/constant-voltage up to 0.2 C, and discharged to 2.1 Volts by a constant-current of 1 C at −20 degrees C. The ratio of the capacity retention rate for the discharge at −20 degrees C. to the capacity retention rate for the discharge at 25 degrees C. was calculated. The capacity retention rate of Example 1 at −20 degrees C. was 75.1%.

Example 2

The same method as Example 1 was carried out to prepare a dispersion of a positive electrode composition, a positive electrode, and a lithium ion secondary battery of Example 2, except for that:
carbon black was trade name "Li-435" manufactured by Denka Co. Ltd., abbreviated as "acetylene black-B" in Table 1, the average primary particle diameter of 23 nm and the DBP absorption of 270 mL/100 g;
the content of the carbon black was 1.0% by mass;
the content of the carbon nanotubes (as the dispersed mass) was 1.0% by mass; and
the content of the N-methyl-2-pyrrolidone solution of polyvinylidene fluoride (as the dissolved mass) was 2.0% by mass.

The obtained product of Example 2 was subjected to the same evaluation processes as Example 1. The results are shown in Table 1.

Example 3

The same method as Example 1 was carried out to prepare a dispersion of a positive electrode composition, a positive electrode, and a lithium ion secondary battery of Example 3, except for that:
carbon black was trade name "Li-100" manufactured by Denka Co. Ltd., abbreviated as "acetylene black-C" in Table 1, the average primary particle diameter of 35 nm and the DBP absorption of 228 mL/100 g;
the content of the carbon black was 1.65% by mass;
the content of the carbon nanotubes (as the dispersed mass) was 1.35% by mass; and
the content of the binder, i.e., the N-methyl-2-pyrrolidone solution of polyvinylidene fluoride (as the dissolved mass) was 2.0% by mass.

The obtained product of Example 3 was subjected to the same evaluation processes as Example 1. The results are shown in Table 1.

Example 4

The same method as Example 2 was carried out to prepare a dispersion of a positive electrode composition, a positive electrode, and a lithium ion secondary battery of Example 4, except for that the active material was lithium iron phosphate having the average particle diameter $D_{50}$ of 1 μm, trade name "P600A" manufactured by Pulead. The obtained product of Example 4 was subjected to the same evaluation processes. The results are shown in Table 1.

Example 5

The same method as Example 2 was carried out to prepare a dispersion of a positive electrode composition, a positive electrode, and a lithium ion secondary battery of Example 5, except for that a carbon nanotube was N-methyl-2-pyrrolidone dispersion of carbon nanotubes having the average diameter of 15 nm and the BET specific surface area of 207 $m^2/g$, trade name "LB100" manufactured by CNano Technology, abbreviated as "CNT-B" in Table 1. The obtained product of Example 5 was subjected to the same evaluation processes. The results are shown in Table 1.

Example 6

The same method as Example 2 was carried out to prepare a dispersion of a positive electrode composition, a positive electrode, and a lithium ion secondary battery of Example 6, except for that the content of the carbon black was 0.8% by mass and the content of the carbon nanotubes (as the dispersed mass) was 1.2% by mass. The obtained product of Example 6 was subjected to the same evaluation processes. The results are shown in Table 1.

Example 7

The same method as Example 2 was carried out to prepare a dispersion of a positive electrode composition, a positive electrode, and a lithium ion secondary battery of Example 7, except for that:
the content of the carbon black was 1.2% by mass;
the content of the carbon nanotubes (as the dispersed mass) was 0.6% by mass; and
the content of the binder, i.e., the N-methyl-2-pyrrolidone solution of polyvinylidene fluoride (as the dissolved mass) was 2.2% by mass.

The obtained product of Example 7 was subjected to the same evaluation processes. The results are shown in Table 1.

Example 8

The same method as Example 2 was carried out to prepare a dispersion of a positive electrode composition, a positive electrode, and a lithium ion secondary battery of Example 8, except for that the content of the carbon black was 0.4% by mass and the content of the carbon nanotubes (as the dispersed mass) was 0.4% by mass. The obtained product of Example 8 was subjected to the same evaluation processes. The results are shown in Table 1.

Example 9

The same method as Example 2 was carried out to prepare a dispersion of a positive electrode composition, a positive electrode, and a lithium ion secondary battery of Example 9, except for that:
the active material was lithium iron phosphate having the average particle diameter $D_{50}$ of 5 μm, manufactured by SIGMA-ALDRICH;
the content of the carbon black was 1.75% by mass; and
the content of the carbon nanotubes (as the dispersed mass) was 1.75% by mass.

The obtained product of Example 9 was subjected to the same evaluation processes. The results are shown in Table 1.

Comparative Example 1

The same method as Example 2 was carried out to prepare a dispersion of a positive electrode composition, a positive electrode, and a lithium ion secondary battery of Comparative example 1, except for that the content of the carbon black was 2.0% by mass and the content of the carbon nanotubes (as the dispersed mass) was zero. The obtained product of Comparative example 1 was subjected to the same evaluation processes. The results are shown in Table 2.

Comparative Example 2

The same method as Example 2 was carried out to prepare a dispersion of a positive electrode composition, a positive electrode, and a lithium ion secondary battery of Comparative example 2, except for that the content of the carbon black was zero and the content of the carbon nanotubes (as the dispersed mass) was 2.0% by mass. The obtained product of Comparative example 2 was subjected to the same evaluation processes. The results are shown in Table 2.

Comparative Example 3

The same method as Example 2 was carried out to prepare a dispersion of a positive electrode composition, a positive electrode, and a lithium ion secondary battery of Comparative example 3, except for that the carbon black was trade name "Li-400" manufactured by Denka Co. Ltd., abbreviated as "acetylene black-D" in Table 2, the average primary particle diameter of 48 nm and the DBP absorption of 177 mL/100 g. The obtained product of Comparative example 3 was subjected to the same evaluation processes. The results are shown in Table 2.

Comparative Example 4

The same method as Example 2 was carried out to prepare a dispersion of a positive electrode composition, a positive electrode, and a lithium ion secondary battery of Comparative example 4, except for that the carbon nanotube was that having the average diameter of 25 nm and the BET specific surface area of 100 m$^2$/g, manufactured by WAKO CHEMICAL, Co. Ltd., abbreviated as "CNT-C" in Table 2. The obtained product of Comparative example 4 was subjected to the same evaluation processes. The results are shown in Table 2.

TABLE 1

| | Formulation | Example 1 | Example 2 | Example 3 | Example 4 | Example 5 |
|---|---|---|---|---|---|---|
| lithium iron phosphate | particle diameter D50 [μm] | 4 | 4 | 4 | 1 | 4 |
| | content of active material in positive electrode composite[%] | 98.0 | 96.0 | 95.0 | 96.0 | 96.0 |
| carbon black | type | acetyleneblack-A | acetyleneblack-B | acetyleneblack-C | acetyleneblack-B | acetyleneblack-B |
| | ave. primary particle size [nm] | 18 | 23 | 35 | 23 | 23 |
| | DBP absorption [mL/100 g] | 310 | 270 | 228 | 270 | 270 |
| carbon nanotubes | type | CNT-A | CNT-A | CNT-A | CNT-A | CNT-B |
| | ave. diameter [nm] | 9 | 9 | 9 | 9 | 15 |
| | BET specific surface area[m$^2$/g] | 243 | 243 | 243 | 243 | 207 |
| | aspect ratio | ≥50 | ≥50 | ≥50 | ≥50 | ≥50 |
| evaluations | X + Y | 1.0 | 2.0 | 3.0 | 2.0 | 2.0 |
| | X/(X + Y) | 0.45 | 0.50 | 0.55 | 0.50 | 0.50 |
| | internal resistance [mΩ] | 25.4 | 20.8 | 22.5 | 21.1 | 26.8 |
| | capacity retention rate at 5 C-discharge [%] | 92.4 | 93.5 | 92.9 | 93.2 | 91.5 |
| | cycle capacity retention rate [%] | 90.4 | 92.5 | 91.5 | 92.4 | 90.1 |
| | capacity retention rate at −20° C. discharge [%] | 75.1 | 78.4 | 73.1 | 78.1 | 72.5 |

| | Formulation | Example 6 | Example 7 | Example 8 | Example 9 |
|---|---|---|---|---|---|
| lithium iron phosphate | particle diameter D50 [μm] | 4 | 4 | 4 | 5 |
| | content of active material in positive electrode composite[%] | 96.0 | 96.0 | 97.2 | 94.5 |
| carbon black | type | acetyleneblack-B | acetyleneblack-B | acetyleneblack-B | acetyleneblack-B |
| | ave. primary particle size [nm] | 23 | 23 | 23 | 23 |
| | DBP absorption [mL/100 g] | 270 | 270 | 270 | 270 |
| carbon nanotubes | type | CNT-A | CNT-A | CNT-A | CNT-A |
| | ave. diameter [nm] | 9 | 9 | 9 | 9 |
| | BET specific surface area[m$^2$/g] | 243 | 243 | 243 | 243 |
| | aspect ratio | ≥50 | ≥50 | ≥50 | ≥50 |
| evaluations | X + Y | 2.0 | 1.8 | 0.8 | 3.5 |
| | X/(X + Y) | 0.40 | 0.67 | 0.50 | 0.50 |
| | internal resistance [mΩ] | 30.5 | 32.1 | 37.2 | 30.5 |
| | capacity retention rate at 5 C-discharge [%] | 85.5 | 84.9 | 82.5 | 84.2 |
| | cycle capacity retention rate [%] | 88.5 | 87.5 | 84.1 | 85.8 |
| | capacity retention rate at −20° C. discharge [%] | 69.5 | 68.4 | 65.1 | 68.1 |

TABLE 2

| Formulation | | Comp. Ex. 1 | Comp. Ex. 2 | Comp. Ex. 3 | Comp. Ex. 4 |
|---|---|---|---|---|---|
| lithium iron phosphate | particle diameter D50 [μm] | 4 | 4 | 4 | 4 |
| | content of active material in positive electrode composite [%] | 96.0 | 96.0 | 96.0 | 96.0 |
| carbon black | type | acetyleneblack-B | — | acetyleneblack-D | acetyleneblack-B |
| | ave. primary particle size [nm] | 23 | — | 48 | 23 |
| | DBP absorption [ml/100 g] | 270 | — | 177 | 270 |
| carbon nanotubes | type | — | CNT-A | CNT-A | CNT-C |
| | ave. diameter [nm] | — | 9 | 9 | 25 |
| | BET specific surface area [m²/g] | — | 243 | 243 | 100 |
| | aspect ratio | — | ≥50 | ≥50 | 40 |
| evaluations | X + Y | 2.0 | 2.0 | 2.0 | 2.0 |
| | X/(X + Y) | 1.00 | 0 | 0.50 | 0.50 |
| | internal resistance [mΩ] | 31.5 | 31.2 | 39.4 | 35.8 |
| | capacity retention rate at 5 C-discharge [%] | 81.5 | 82.4 | 78.4 | 72.5 |
| | cycle capacity retention rate [%] | 80.5 | 81.4 | 79.7 | 78.2 |
| | capacity retention rate at −20° C. discharge [%] | 65.3 | 58.8 | 56.8 | 63.3 |

The results in Table 1 illustrate that the lithium ion secondary batteries made from the compositions according to the embodiments of the present invention have high energy density and excellent cycle characteristics. In addition, the present batteries have small internal resistance, and are also excellent in the output characteristics and low-temperature characteristics.

REFERENCE SIGNS LIST

1: Positive electrode
2: Negative electrode
3: Polyolefin microporous film
4: Aluminum laminate exterior
5: Positive electrode aluminum tab
6: Negative electrode nickel tab

We claim:

1. A composition for a positive electrode of a lithium ion secondary battery, the composition comprising:
   an active material capable of storing and extracting lithium ion; and
   an electric conductive material,
   wherein the active material is lithium iron phosphate,
   wherein the conductive material includes carbon black and carbon nanotube,
   wherein the carbon black has an average primary particle diameter of 39 nm or less, and
   wherein the carbon nanotube has an average diameter of 20 nm or less, and
   wherein, given that contents of the carbon black and the carbon nanotube in the composition are X and Y (unit: % by mass), respectively, the following condition is satisfied, $0.45 \leq \{X/(X+Y)\} < 0.50$.

2. The composition according to claim 1, wherein, given that contents of the carbon black and the carbon nanotube in the composition are X and Y (unit: % by mass), respectively, the following conditions A and B are satisfied, $1.0 \leq (X+Y) \leq 3.0$      A.

$0.45 \leq \{X/(X+Y)\} \leq 0.55 < 0.50$      B.

3. The composition according to claim 1, wherein the carbon black has a DBP absorption amount of 200 to 380 mL/100 g.

4. The composition according to claim 1, wherein the carbon nanotube has a BET specific surface area of 170 m²/g or more and an aspect ratio of 50 or more.

5. The composition according to claim 1, wherein the lithium iron phosphate has an average particle diameter $D_{50}$ of 1 to 4 μm.

6. The composition according to claim 1, wherein the carbon nanotube has an average diameter of 10 nm or less.

7. The composition according to claim 1, wherein the composition includes the lithium iron phosphate in an amount of 95% by mass or more.

8. A positive electrode for a lithium ion secondary battery, comprising the composition according to claim 1.

9. A lithium ion secondary battery, comprising the positive electrode according to claim 8.

* * * * *

UNITED STATES PATENT AND TRADEMARK OFFICE
CERTIFICATE OF CORRECTION

PATENT NO. : 12,132,204 B2
APPLICATION NO. : 17/295235
DATED : October 29, 2024
INVENTOR(S) : Tatsuya Nagai, Shinichiro Osumi and Tetsuya Ito It is certified that error appears in the above-identified patent and that said Letters Patent is hereby corrected as shown below:

In the Claims

Column 14, Claim 2, Line 33:
Replace: "$0.45 \leq \{X/(X+Y)\} \leq 0.55 < 0.50$"
With: -- $0.45 \leq \{X/(X+Y)\} < 0.50$ --

Signed and Sealed this
Thirty-first Day of December, 2024

Derrick Brent
*Acting Director of the United States Patent and Trademark Office*